United States Patent
Murakawa

(10) Patent No.: US 8,701,064 B2
(45) Date of Patent: Apr. 15, 2014

(54) TIMING ERROR REMOVING METHOD AND DESIGN SUPPORT APPARATUS

(71) Applicant: Fujitsu Limited, Kawasaki (JP)

(72) Inventor: Ikuko Murakawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/973,789

(22) Filed: Aug. 22, 2013

(65) Prior Publication Data
US 2013/0346931 A1    Dec. 26, 2013

Related U.S. Application Data

(63) Continuation of application No. PCT/JP2011/056457, filed on Mar. 17, 2011.

(51) Int. Cl.
*G06F 17/50* (2006.01)

(52) U.S. Cl.
USPC ............ 716/108; 716/113; 716/114; 716/134

(58) Field of Classification Search
CPC .............. H04L 1/1853; H04L 49/9047; G06F 17/5072; G06F 17/5077; G06F 3/0656; G06F 2003/0691
USPC ................................. 716/108, 113, 114, 134
See application file for complete search history.

(56) References Cited

U.S. PATENT DOCUMENTS

| | | | | |
|---|---|---|---|---|
| 6,230,302 B1 * | 5/2001 | Gabele et al. | ................. | 716/102 |
| 6,467,021 B1 * | 10/2002 | Sinclair | ........................ | 711/113 |
| 7,039,890 B2 * | 5/2006 | Takechi et al. | ................. | 716/113 |
| 7,047,504 B2 * | 5/2006 | Kawano | ........................ | 716/102 |
| 7,353,482 B2 * | 4/2008 | Murakawa | ..................... | 716/139 |
| 7,367,005 B2 * | 4/2008 | Kosugi et al. | .................. | 716/114 |
| 7,596,643 B2 * | 9/2009 | Merry et al. | ..................... | 710/56 |
| 7,822,888 B2 * | 10/2010 | Saito et al. | ....................... | 710/38 |
| 7,904,865 B2 * | 3/2011 | Yifrach et al. | ................. | 716/126 |

(Continued)

FOREIGN PATENT DOCUMENTS

| | | |
|---|---|---|
| JP | 2000-020567 | 1/2000 |
| JP | 2004-326453 | 11/2004 |
| JP | 2008-052659 | 3/2008 |
| JP | 2009-016487 | 1/2009 |

OTHER PUBLICATIONS

Patent Abstracts of Japan, Publication No. 2008-052659, Published Mar. 6, 2008.

(Continued)

*Primary Examiner* — Sun Lin
(74) *Attorney, Agent, or Firm* — Staas & Halsey LLP

(57) ABSTRACT

A timing error removing method includes selecting a logic-level correction location and a first buffer to be inserted at the logic-level correction location, wherein the logic-level correction location and the first buffer are able to remove a timing error in a semiconductor integrated circuit to be designed; and searching for a vacant area in the semiconductor integrated circuit where the first buffer can be placed for the logic-level correction location, and if the vacant area is not found, further searching for a combination of a plurality of buffers smaller than the first buffer, the combination of the plurality of buffers being able to be placed in the semiconductor integrated circuit and being able to replace the first buffer in terms of a delay obtained as if the first buffer is inserted.

9 Claims, 13 Drawing Sheets

(56) References Cited

U.S. PATENT DOCUMENTS

| | | | |
|---|---|---|---|
| 8,281,276 B2 * | 10/2012 | Nonaka | 716/134 |
| 8,327,308 B2 * | 12/2012 | Nakagawa | 716/134 |
| 2002/0157074 A1 * | 10/2002 | Sato | 716/10 |

OTHER PUBLICATIONS

Patent Abstracts of Japan, Publication No. 2009-016487, Published Jan. 22, 2009.

Patent Abstracts of Japan, Publication No. 2000-020567, Published Jan. 21, 2000.

Patent Abstracts of Japan, Publication No. 2004-326453, Published Nov. 18, 2004.

International Search Report mailed Jun. 14, 2011 in PCT/JP2011/056457.

* cited by examiner

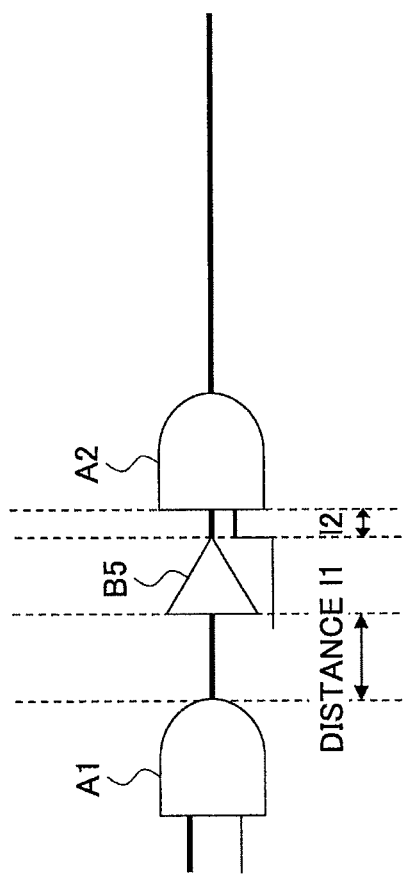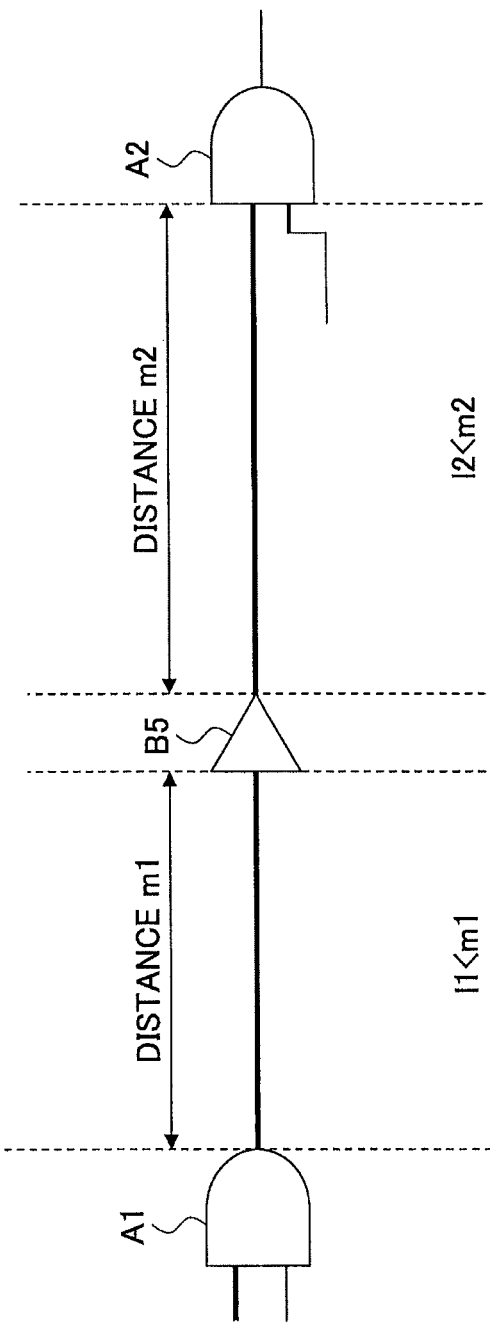
FIG.3A
FIG.3B

| | BUFFER NAME | LOGIC CORRECTION LOCATION |
|---|---|---|
| 1 | BUF4 | M1/E1/in |
| 2 | BUF8 | M1/E5/in |
| 3 | BUF5 | M1/A2/in |
| 4 | BUF4 | M1/A5/in |
| 5 | BUF2 | M1/A5/in |
| 6 | BUF8 | M2/B1/in |
| 7 | BUF8 | M2/C1/in |
| 8 | ...... | |

| BUFFER NAME | SIZE | DELAY VALUE |
|---|---|---|
| BUF1 | 1 | 2ps |
| BUF2 | 2 | 4ps |
| BUF4 | 4 | 8ps |
| BUF5 | 5 | 10ps |
| BUF8 | 8 | 16ps |
| BUFC | 12 | 32ps |
| BUFG | 24 | 64ps |

FIG.10

| | SIZE | COORDINATES (x,y) CL |
|---|---|---|
| 1 | 10 | (1300,240) |
| 2 | 10 | (1340,220) |
| 3 | 8 | (1320,240) |
| 4 | 4 | (1300,220) |
| 5 | 2 | (1300,230) |
| 6 | 2 | (1340,212) |
| 7 | ...... | |

NOMINAL DELAY

MINIMUM DELAY

MAXIMUM DELAY

NOMINAL DELAY

MINIMUM DELAY

MAXIMUM DELAY

TIMING ERROR REMOVING METHOD AND DESIGN SUPPORT APPARATUS

CROSS-REFERENCE TO RELATED APPLICATIONS

This application is a continuation application of International Application PCT/JP2011/056457 filed on Mar. 17, 2011 and designated the U.S., the entire contents of which are incorporated herein by reference.

FIELD

The disclosures herein relate to a timing error removing method for a semiconductor integrated circuit and a design support apparatus.

BACKGROUND

In a digital LSI (or a semiconductor integrated circuit), a data signal is taken in and synchronized with timing signals such as a clock signal and the like. Therefore, for designing a digital LSI, timing specifications are required for guaranteed operation. Major timing specifications include setup time and hold time. The setup time is a time for a data signal to be fixed and held before a timing signal arrives. The hold time is a time for a data signal to be held after a timing signal has arrived.

In general, although layout tools for digital LSIs execute layout considering such timing specifications, it is often the case that timing specification violations (timing errors) remain partially. To efficiently remove timing errors, layout needs to be corrected without influencing a part that has no timing errors. Thereupon, timing error removal has been attempted by inserting buffers and the like into a part that has timing errors, with limiting a range that is influenced by the insertion. Here, layout correction for removing timing errors is called timing ECO (Engineering Change Order).

FIG. 1 is a schematic view illustrating an example of removal of a timing error. In FIG. 1, assume that a path T1 from a sequential circuit element FF1 to another element FF4 and another path T2 from FF2 to FF4 have hold time violations (hold time errors), respectively. On the other hand, assume that a path T3 from FF3 to FF4 has no margin for setup time. Here, a path is a route in a circuit that has a data output pin of an arbitrary sequential circuit element as a start point, and a data input pin of a sequential circuit element as an end point.

In a circumstance illustrated in FIG. 1, an effective logic-level correction location may be selected along a path having a timing error, at which an insert buffer may be selected or the size of an existing cell (logic) may be reselected. The word "effective" here means that a timing error is corrected with a few inserted or replaced cells. In the example in FIG. 1, an effective solving method may be to insert a buffer B5 at a location designated with P1 (referred to as a "location P1", hereafter) because it does not have an influence on the path T3, yet the hold time errors of the paths T1 and T2 can be removed. In this case, the buffer B5 can add a delay to data signals on the paths T1 and T2 without influencing the path T3, which removes the hold time errors on the paths T1 and T2.

Conventionally, the following steps are executed for removing such timing errors.

Step 1: Determine whether there are timing errors in a layout result.

Step 2: If there are any timing errors, select a logic-level insert location and a buffer to be inserted. For example, the location P1 and the buffer B5 are selected as illustrated in FIG. 1.

Step 3: Based on the result at Step 2, determine a physical placement position of the buffer. For example, a physical placement position of the buffer B5 is determined to be the location P1 in FIG. 1.

Step 4: Select a routing layer and a wiring pattern for a part to be wired.

Here, Step 2 and Step 3 are mutually independent. Namely, at Step 2, layout information is not referenced for selecting an insert buffer, while using a delay model that assumes no new wiring capacitances are generated when a buffer is inserted.

On the other hand, at Step 3, a netlist is received as input that reflects the logical correction generated at Step 2, to determine a physical position of an insert buffer. Here, the physical placement position of the insert buffer is limited to a vacant area where the insert buffer can be placed, hence a great error difference may be found between a delay based on the delay model at Step 2 and a delay that reflects an actual placement position.

For example, FIG. 2 is a schematic view illustrating an example of an actual placement position of an insert cell. In FIG. 2, vacant areas neighboring the location P1 (an input pin of the cell A2) in FIG. 1 is illustrated. In FIG. 2, shaded parts designate already placed instance cells. On the other hand, non-shaded white parts designate vacant areas.

If the size of the buffer B5 selected to be inserted at Step 2 is 5 (height 1, width 5), the only vacant area where the buffer B5 can be inserted is the lower-left part in FIG. 2. Therefore, the buffer B5 is placed in the lower-left vacant area at Step 3. Then, an error difference of delay arises between the signal path designated with a solid line arrow s1 in FIG. 2, on which delay calculation at Step 2 is based, and the signal path designated with dashed line arrows s2 and s3, on which delay calculation with the actual placement position is based. This point will be described in detail with reference to FIG. 3.

FIGS. 3A-3B are schematic views illustrating difference in relative distances between an insert buffer and preceding/succeeding cells before and after buffer selection.

FIG. 3A illustrates an expected position (namely, the location P1) when selecting the buffer B5. In FIG. 3A, the distance from the output pin of the cell A1 to the input pin of the buffer B5 is designated with a distance l1, and the distance from the output pin of the buffer B5 to an input pin of the cell A2 is designated with a distance l2.

On the other hand, FIG. 3B illustrates a placed position of the buffer B5 after selection. In FIG. 3B, the distance from the output pin of the cell A1 to the input pin of the buffer B5 is designated with a distance m1 (l1<m1), and the distance from the output pin of the buffer B5 to an input pin of the cell A2 is designated with a distance m2 (l2<m2).

Namely, the actual distance from the output pin of the cell A1 to the input pin of the buffer B5, and the actual distance from the output pin of the buffer B5 and the input pin of the cell A2 are longer than the expected distances obtained at Step 2.

Consequently, problems may arise, for example, the buffer B5 inserted to remove hold time errors causes a setup time error, or the hold time errors are not removed because a buffer is not inserted to avoid a setup time error. In such cases, a repeated execution of timing ECO may generate the same result, hence the location P1 selected at Step 2 in the previous execution needs to be removed from candidate correction locations, before executing timing ECO again. Such a repetition makes the whole process of timing error correction longer.

Thereupon, a method has been devised in that Steps 2 and 3 are integrated so that layout information is referenced at Step 2 (see, for example, Patent Document 1). Namely, once an insert buffer is selected, a physical placement position of the insert buffer is determined immediately. Based on the result, delay calculation and updating of slack values are executed to determine whether timing errors can be corrected. Here, a slack value is a difference between a required arrival time and an actual signal arrival time calculated assuming that setup time and hold time specifications are satisfied, which represents a delay margin.

RELATED-ART DOCUMENTS

Patent Documents

[Patent Document 1] Japanese Laid-open Patent Publication No. 2008-52659

However, the technology disclosed in Patent Document 1 needs to search for an area where a selected insert buffer can be placed at first. Consequently, there is likelihood in that the whole process of timing error correction becomes longer.

SUMMARY

According to an embodiment, a timing error removing method includes selecting a logic-level correction location and a first buffer to be inserted at the correction location, the logic-level correction location and the first buffer being able to remove a timing error in a semiconductor integrated circuit to be designed; and searching for a vacant area in the semiconductor integrated circuit where the first buffer can be placed for the correction location, and if the vacant area is not found, further searching for a combination of a plurality of buffers smaller than the first buffer, the combination of the plurality of buffers being able to be placed in the semiconductor integrated circuit and being able to replace the first buffer in terms of a delay obtained as if the first buffer is inserted.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIGS. 3A-3B are schematic views illustrating difference between a logic-level position of an insert buffer and an actual placement position;

FIG. 7 is a schematic view illustrating an example of logic correction information;

FIG. 8 is a schematic view illustrating an example of buffer list information;

FIG. 10 is a schematic view illustrating an example of a candidate area list CL;

DESCRIPTION OF EMBODIMENTS

In the following, embodiments of the present invention will be described with reference to the drawings. According to the embodiments, timing error removal of a semiconductor integrated circuit can be made efficient.

Figure 4:
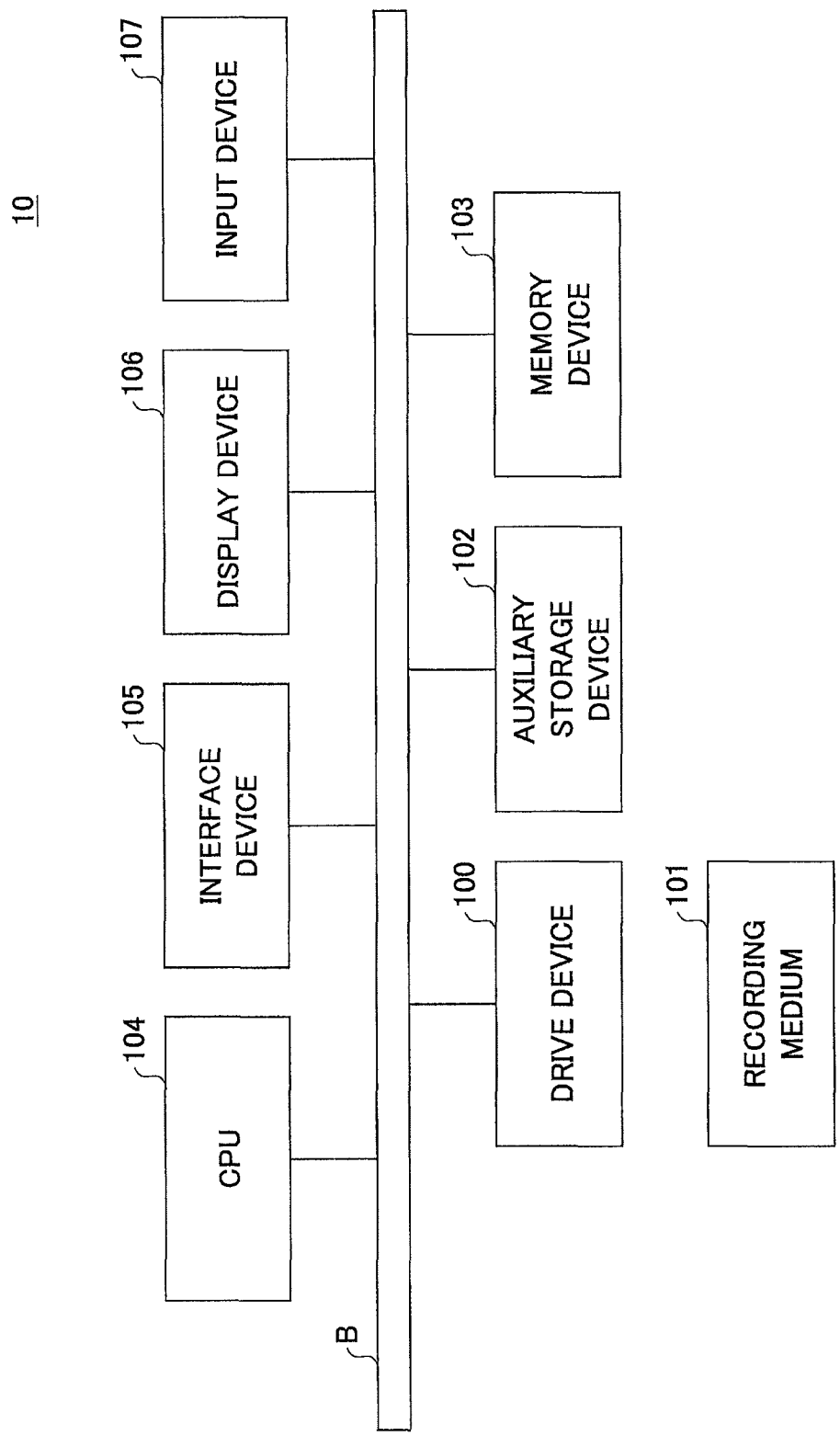
FIG. 4 is a schematic view illustrating an example of a hardware configuration of an LSI design support apparatus according to an embodiment of the present invention.

FIG. 4 is a schematic view illustrating an example of a hardware configuration of an LSI design support apparatus according to an embodiment of the present invention. An LSI design support apparatus 10 in FIG. 4 includes a drive device 100, an auxiliary storage device 102, a memory device 103, a CPU 104, an interface device 105, a display device 106, an input device 107, and the like that are mutually connected by a bus B.

A program that performs processing on the LSI design support apparatus 10 is provided with a recording medium 101. When the recording medium 101 storing the program is set in the drive device 100, the program is installed into the auxiliary storage device 102 from the recording medium 101 via the drive device 100. However, installation of the program is not necessarily executed from the recording medium 101, but may be downloaded from another computer via a network. The auxiliary storage device 102 stores the installed program, and stores required files, data, and the like as well.

The memory device 103 reads the program from the auxiliary storage device 102 to store the program into it when receiving a start command for the program. The CPU 104 implements functions relevant to the LSI design support apparatus 10 by executing the program stored in the memory device 103. The interface device 105 is used as an interface for connecting with a network. The display device 106 displays a GUI (Graphical User Interface) and the like for the program. The input device 107 includes a keyboard, a mouse, and the like, which are used for inputting various operational commands.

Here, an example of the recording medium 101 may be a CD-ROM, a DVD disk, or a portable recording medium such as a USB memory, etc. Also, an example of the auxiliary storage device 102 may be an HDD (Hard Disk Drive), a flash memory, or the like. Both the recording medium 101 and the auxiliary storage device 102 correspond to computer-readable recording media.

Figure 5:
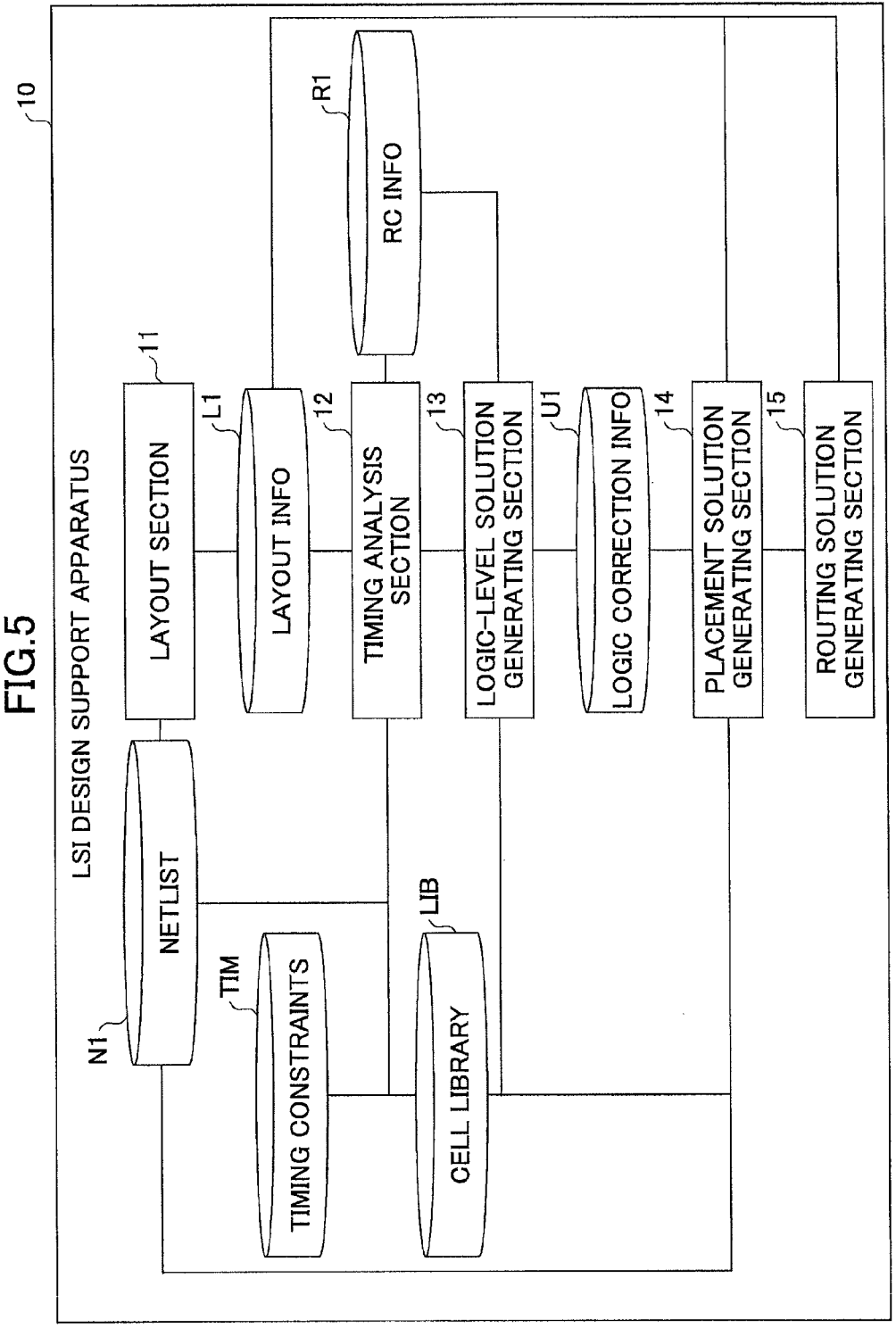
FIG. 5 is a schematic view illustrating an example of a functional configuration of an LSI design support apparatus according to an embodiment of the present invention.

FIG. 5 is a schematic view illustrating an example of a functional configuration of an LSI design support apparatus according to an embodiment of the present invention. In FIG. 5, the LSI design support apparatus 10 includes a layout section 11, a timing analysis section 12, a logic-level solution generating section 13, a placement solution generating section 14, a routing solution generating section 15, and the like.

These sections are implemented by processes that the program installed in the LSI design support apparatus 10 has the CPU 104 execute.

Based on a netlist N1 of a semiconductor integrated circuit (simply called a "circuit", hereafter) to be designed, the layout section 11 simulates placement of cells (logic) in the circuit and routing between the cells (placement and routing), and generates layout information L1. The netlist N1 is information including connection information between pins in the circuit, and the like. The layout information L1 is information representing a result of placement and routing.

The timing analysis section 12 extracts RC information R1 (information including wiring capacitance, resistance, and the like) from the layout information L1, and detects timing errors based on the netlist N1, the RC information R1, a cell library LIB, timing constraints TIM, and the like.

The cell library LIB includes information for each usable cell including the shape, pin positions, function, and the like. Information about setup time, hold time, and the like is also included. The timing constraints TIM represent information on timing specifications required for guaranteed operation of the circuit. Specifically, it includes delay restrictions on paths in the logic circuit.

The logic-level solution generating section 13 generates a logic-level solution for removing timing errors detected by the timing analysis section 12. More specifically, the logic-level solution generating section 13 selects logic-level correction locations in the circuit, and buffers (insert buffers) and the like to be inserted at the correction locations. The logic-level solution generating section 13 outputs the generated logic solution as logic correction information U1.

The placement solution generating section 14 determines whether the insert buffers can be placed by referring to the layout information L1, and the like based on the logic solution correction information U1. If one of the insert buffers cannot be placed, the placement solution generating section 14 searches for a combination of multiple buffers smaller than the insert buffer that can also replace the insert buffer in terms of delay, and is to be placed in the circuit.

The routing solution generating section 15 executes routing of parts to be wired for the inserted buffers and the like.

Here, the netlist N1, the timing constraints TIM, the cell library LIB, and the like are stored into the auxiliary storage device 102 or a storage device, etc., connected with the LSI design support apparatus 10 via a network. Also, the layout information L1, the RC information R1, the logic correction information U1, and the like are stored into the auxiliary storage device 102, a storage device, etc., connected with the LSI design support apparatus 10 via a network.

Figure 6:
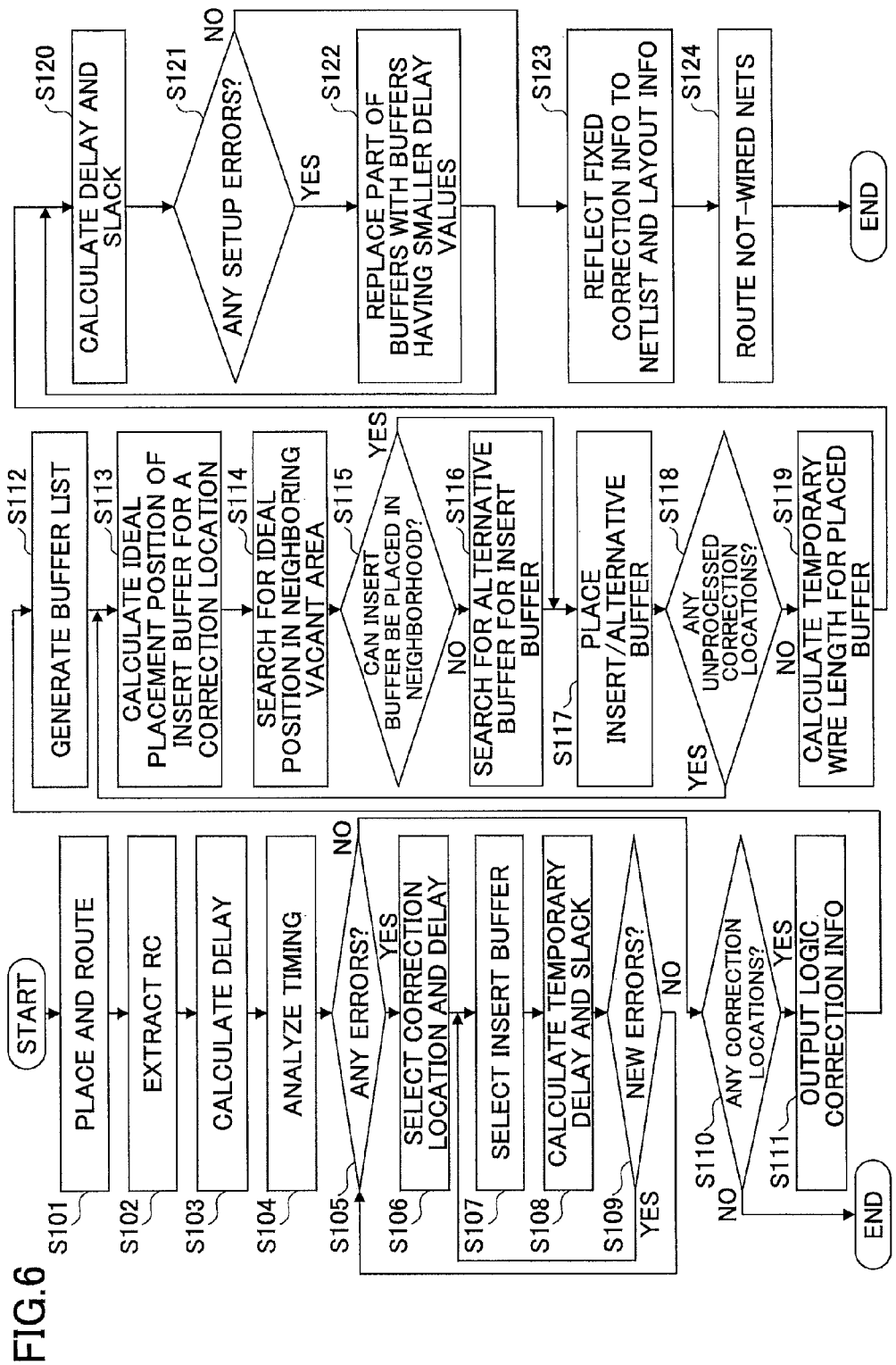
FIG. 6 is a flowchart illustrating an example of processing steps of a timing error removal procedure.

In the following, processing steps of the LSI design support apparatus 10 will be described. FIG. 6 is a flowchart illustrating an example of processing steps of a timing error removal procedure. In the present embodiment, an example of correction of hold time violations (hold time errors) will be described.

At Step S101, the layout section 11 executes placement and routing based on the netlist N1 of a circuit to be laid out, and generates the layout information L1 (S101). Next, the timing analysis section 12 executes RC extraction based on the wiring information included in the layout information L1 (S102). As a result of RC extraction, the RC information R1 is generated. Next, the timing analysis section 12 executes delay calculation based on the netlist N1, the RC information R1, and delay and function information of cells included in the cell library LIB (S103). Next, the timing analysis section 12 executes STA (Static Timing Analysis) based on the result of delay calculation and the timing constraints information TIM, to obtain delay slack values (slack values) for both setup time and hold time constraints (S104). Next, the timing analysis section 12 determines whether there are any hold time errors, based on the delay slack values (S105). If there are no hold time errors (S105-No), the procedure in FIG. 6 ends.

On the other hand, if a hold time error is detected (S105-Yes), to remove the hold time error (simply called an "error", hereafter), the logic-level solution generating section 13 generates a logic solution at Step S106 and after. Here, a single error is considered as a target to be removed at Step S106 and after. Therefore, if multiple errors are detected, Steps S106 to S109 are executed repeatedly.

At Step S106, the logic-level solution generating section 13 selects a logic-level correction location (called "logic correction location", hereafter) for efficiently removing an error to be removed, and determines a correctable delay amount at the location (S106). For example, in the example in FIG. 1, the location P1 is selected as a logic correction location, and the correctable delay amount is determined at the location P1. A correctable delay amount means a delay amount that can be added without causing a new timing error. Here, a preceding cell at a logic correction location is simply called a "preceding cell" in the following. Also, a succeeding cell at a logic correction location is simply called a "succeeding cell" in the following. In the example in FIG. 1, the cell A1 is a preceding cell, and the cell A2 is a succeeding cell.

Next, the logic-level solution generating section 13 selects one or more buffers (called "insert buffers", hereafter) among those registered in the cell library LIB that have delay values corresponding to a correctable delay amount (S107). Namely, multiple buffers may be inserted at a logic correction location. In the example in FIG. 1, the buffer B5 corresponds to an insert buffer. Next, logic-level solution generating section 13 executes delay calculation assuming that the insert buffer is inserted at the logic correction location (S108). The content of delay calculation may be the same as at Step S103. As a result of delay calculation, the delay slack values for both of the setup time and hold time constraints are recalculated (updated).

Here, as for delay calculation at Step S108, the logic-level solution generating section 13 executes delay calculation based on, predetermined rules so that the placement solution generating section 14 can reproduce (or can recognize) the delay correction amount expected (or planned) by the logic-level solution generating section 13. The predetermined rules may be determined beforehand between the logic-level solution generating section 13 and the placement solution generating section 14. Alternatively, the logic-level solution generating section 13 may record information designating the predetermined rules into the memory device 103 or the auxiliary storage device 102 when executing delay calculation.

As an example of predetermined rules for delay calculation, an appropriate value should be used for wiring RC information from the output pin of an insert buffer to the input pin of a succeeding cell, and wiring RC information from the output pin of a preceding cell to the input pin of the insert buffer. For example, delay calculation may be executed based on rules that, for the former RC information, wiring RC information before inserting the insert buffer is used that is of the wire connecting the output pin of the preceding cell with the input pin of the succeeding cell, and for the latter RC information, 0 is used. Also, information on a signal waveform slew (called a "waveform slew", hereafter) at the output pin of the preceding cell may be preserved into the memory device 103 or the auxiliary storage device 102, which is obtained during the process of delay calculation by the timing analysis section 12 or the logic-level solution generating section 13. This is to make the information be available for delay calculation executed by the placement solution generating section 14.

Next, the logic-level solution generating section 13 determines whether a new timing error is generated with the insertion of the insert buffer (S109). Namely, whether a hold time error exists is determined based on the delay slack values updated at Step S108.

If a new error is generated (S109-Yes), the logic-level solution generating section 13 repeatedly executes Step S107 and after. Namely, insert buffers are reselected and delay calculation and the like are re-executed. On the other hand, if no new errors are found (S109-No), the logic-level solution generating section 13 determines whether any hold time errors remain in the circuit (S105). Namely, Steps S106 to S109 are repeated until all hold errors are identified and removed.

If all hold errors are removed (S105-No), the logic-level solution generating section 13 determines whether there are logic correction locations (S110). Namely, it is determined whether at least one logic correction location has been selected at Step S106.

If there are no logic correction locations (S110-No), the procedure in FIG. 6 ends. If there are logic correction locations (S110-Yes), the logic-level solution generating section 13 outputs (records) logic correction information U1, which is information that associates a logic correction location with an insert buffer, into the memory device 103 or the auxiliary storage device 102 (S111). Here, the logic correction information U1 may be output partially and sequentially while processing Steps S106 to S108.

FIG. 7 is a schematic view illustrating an example of logic correction information U1. Logic correction information U1 illustrated in FIG. 7 includes buffer names and logic correction locations for the insert buffer. A buffer name is an identification name for one of the insert buffers. A logic correction location is a logic-level position where the insert buffer is to be inserted, which includes the output pin of the preceding cell or the input pin of the succeeding cell in its identification information. Namely, if a logic correction location is ended with "in", it indicates that the insert location of the insert buffer is at the front side of the input pin of the succeeding cell that is identified with the identifier before "in" ("M1/E1" or the like). On the other hand, if a logic correction location is ended with "out", it indicates that the insert location of the insert buffer is at the rear side of the output pin of the preceding cell that is identified with the identifier before "out".

Next, the placement solution generating section 14 executes its operation based on the logic correction information U1 and the like. At Step S112, the placement solution generating section 14 extracts list information that includes sizes and delay values of usable buffers (called "buffer list information", hereafter) from the cell library LIB (S112).

FIG. 8 is a schematic view illustrating an example of buffer list information. In FIG. 8, buffer list information BL includes the buffer name, size, delay value, and the like for each buffer. A buffer name is the identification name of a buffer. A size is the size of a buffer. Example buffers in FIG. 8 assume that their heights are fixed to one. Namely, the size value happens to indicate a width. However, both values of height and width may be indicated for representing a size. A delay value is the delay value of a buffer itself.

Next, the placement solution generating section 14 calculates an ideal placement position for the insert buffer with respect to a logic correction location (called "buffer to be inserted", hereafter) (S113). Specifically, the placement solution generating section 14 extracts a logic correction location and all buffer names that are associated with the logic correction location from the logic correction information U1. The placement solution generating section 14 calculates position information of the logic correction location with reference to the netlist N1 and layout information L1. The position information is set as the ideal placement position for the insert buffer.

Next, the placement solution generating section 14 searches vacant areas in neighboring areas for the ideal placement position, generates list information (called "candidate area list CL", hereafter) about continuous vacant areas (called "candidate areas", hereafter) (S114).

Figure 9:
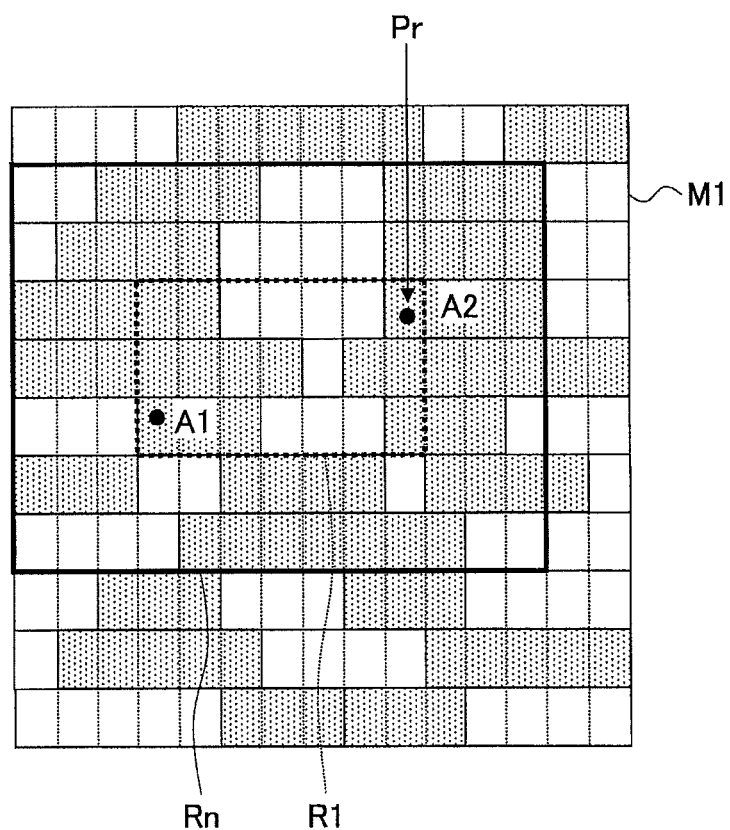
FIG. 9 is a schematic view illustrating an example of an ideal placement position and a neighboring area.

FIG. 9 is a schematic view illustrating an example of an ideal placement position and a neighboring area. A placement map M1 illustrated in FIG. 9 is visualized neighboring layout information of an ideal placement position that is generated by the placement solution generating section 14, based on the layout information L1. A minimum unit rectangle in the placement map M1 corresponds to the unit size of buffers. Namely, a single rectangle corresponds to the size one. Shaded rectangles designate placed cells, and white rectangles designate vacant areas.

Figure 1:
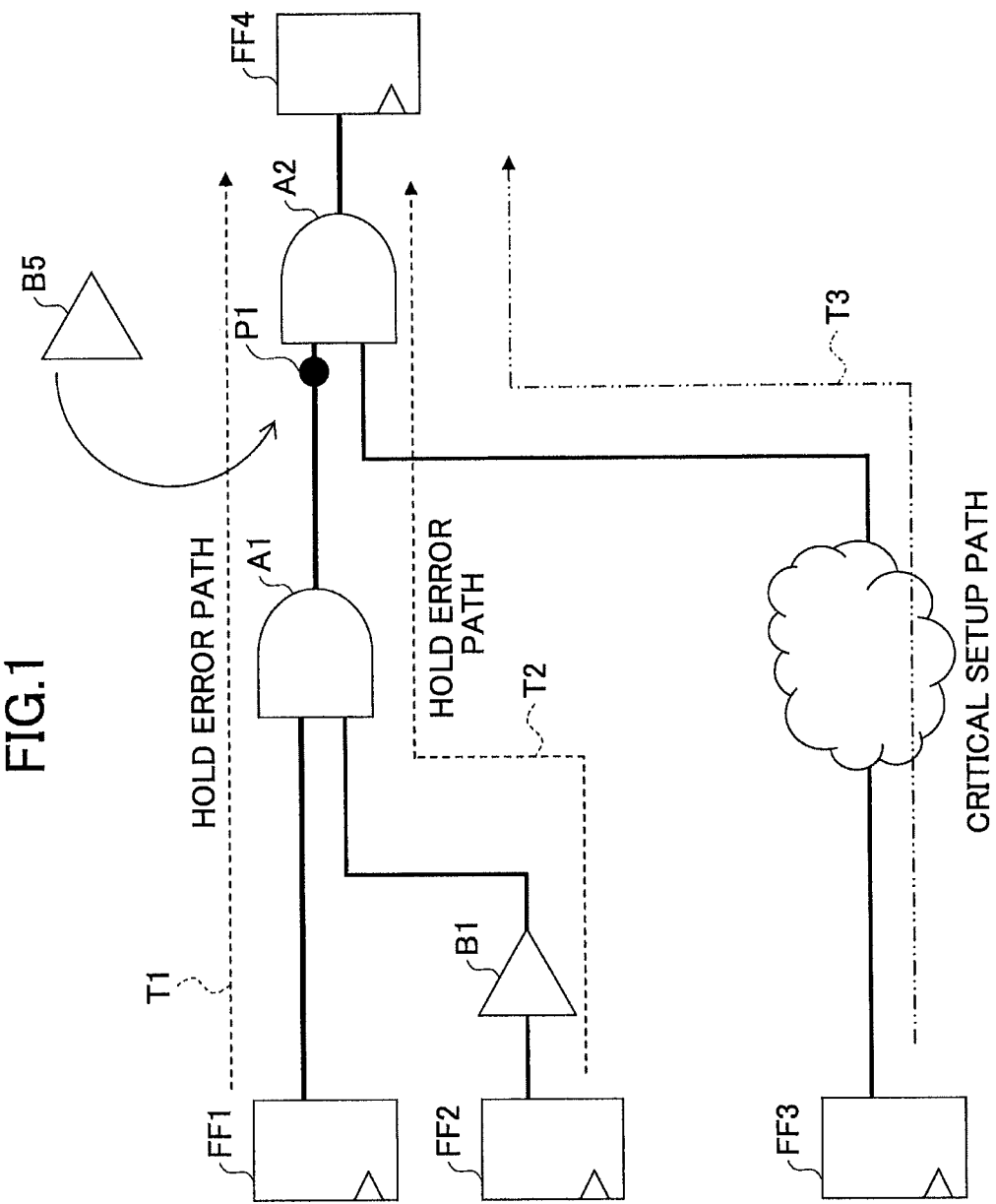
FIG. 1 is a schematic view illustrating an example of removal of a timing error.
Figure 2:
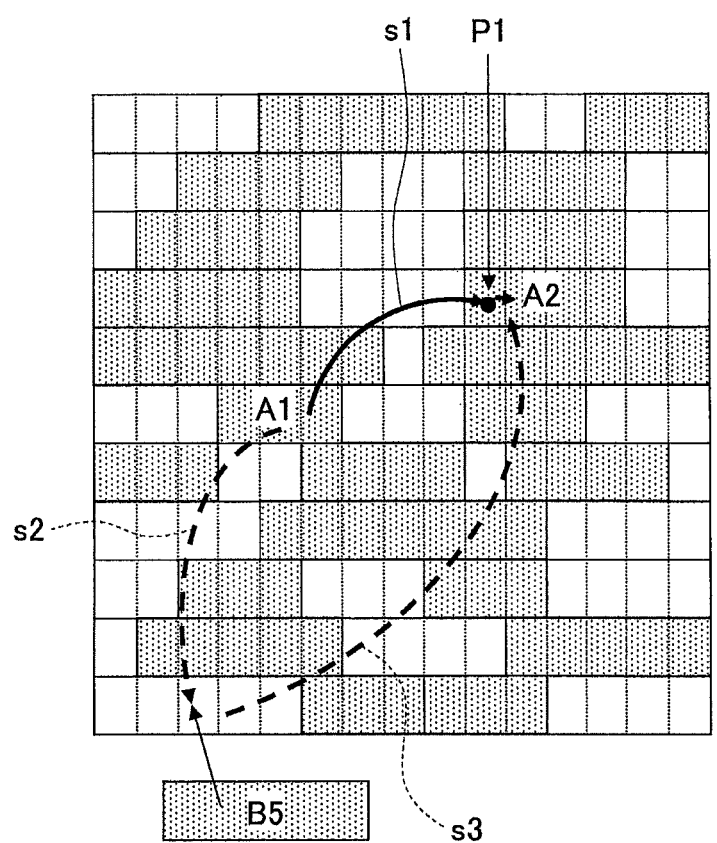
FIG. 2 is a schematic view illustrating an example of an actual placement position of an insert cell.

In the placement map M1, areas with A1 and A2 attached are assumed to correspond to the cell A1 and cell A2 in FIG. 1, respectively. Here, a logic correction location is also assumed to be identified at the input pin of the cell A2. Namely, the succeeding cell of a buffer to be inserted for the logic correction location is the cell A2, and the preceding cell is the cell A1. In FIG. 9, the position of the input pin of the cell A2 is assumed to be the position designated with Pr. Therefore, the position designated with Pr is calculated as the ideal placement position for the buffer to be inserted for the logic correction location (called the "ideal placement position Pr", hereafter).

Also, a rectangle area centered around a minimum rectangle area R1 that encloses the ideal placement position Pr and the cell A1, which is the preceding cell of the buffer to be inserted, is set as the neighboring area. Here, the preceding cell is enclosed because the logic correction location relevant to the ideal placement position Pr is located at a position that corresponds to the input pin of the succeeding cell. Therefore, if the logic correction location were located at a position that corresponds to the output pin of the preceding cell, the neighboring area would be set to a rectangle area centered around a minimum rectangle area that encloses the logic correction location relevant to the ideal placement position and the succeeding cell. A neighboring area is for restricting a search range for candidate areas. The reason for restricting a search range for candidate areas around the neighborhood for the ideal placement position is to make an error difference smaller with respect to a delay amount expected by the logic-level solution generating section 13 when calculating a combination of alternative buffers that has substantially the same delay as the buffer to be inserted at Step S116, which will be described later.

In the example in FIG. 9, the rectangle area Rn is set as the neighboring area. Here, the neighboring area Rn may be expanded if no vacant areas are found during the search process of vacant areas. Also, the neighboring area Rn does not necessarily need to be a rectangle area centered around the rectangle area R1. Also, the rectangle area Rn may be an area that is identical to the rectangle area R1.

FIG. 10 is a schematic view illustrating an example of a candidate area list CL. The candidate area list CL illustrated in FIG. 10 stores the size and coordinate values for each candidate area. A size represents magnitude of a candidate area. Coordinate values are position information of a candidate area, for example, coordinate values of a predetermined vertex of a candidate area.

Next, the placement solution generating section 14 determines whether all buffers to be inserted can be exclusively placed in the candidate areas listed in the candidate area list CL (S115). If a candidate area is greater than or equal to the size of an arbitrary buffer to be inserted, it is determined that the buffer to be inserted can be placed at the candidate area. Here, "exclusively" means that multiple buffers to be inserted are not placed in a single candidate area.

If it is possible that all buffers to be inserted are exclusively placed (S115-Yes), each of the buffers to be inserted is placed at the respective candidate area that has been determined for the buffer to be placed (S117).

If at least one of the buffers to be inserted cannot be placed (S115-No), the placement solution generating section 14 searches for a combination of buffers whose sizes are smaller than the buffer to be inserted, and the combined delay is substantially the same as the delay of the buffer to be inserted, with reference to the buffer list information BL (S116). The placement solution generating section 14 replaces the buffer to be inserted with the search-determined combination of buffers (called "alternative buffers", hereafter). Here, alternative buffers are logically equivalent to the buffer that has been supposed to be inserted.

Figure 11:
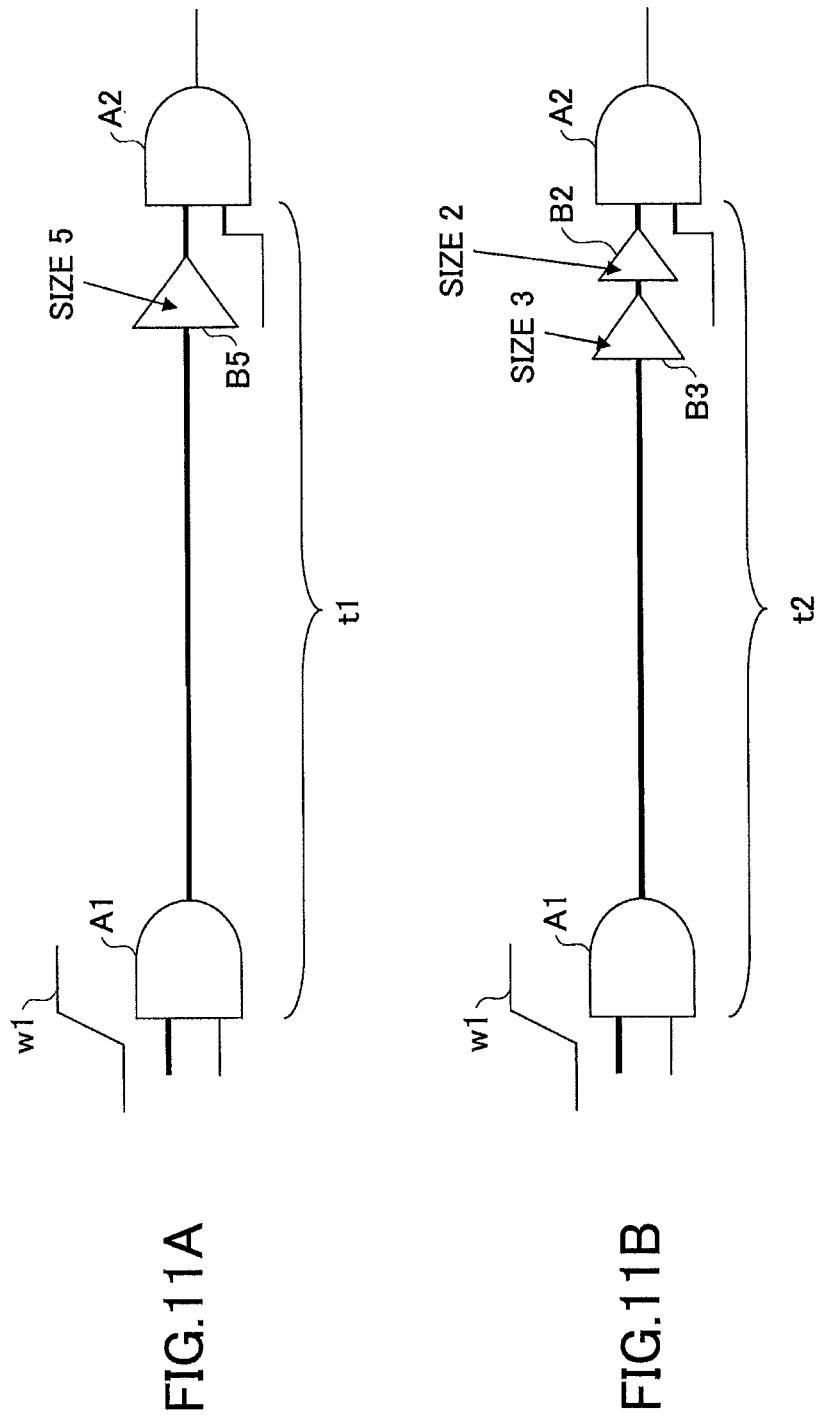
FIGS. 11A-11B are schematic views illustrating an example of alternative buffers.

FIGS. 11A-11B are schematic views illustrating an example of alternative buffers. FIG. 11A illustrates a state where an insert buffer B5 is inserted between a cell A1 and a cell A2. The size of the insert buffer B5 is assumed to be five. On the other hand, FIG. 11B illustrates an example where the insert buffer B5 is replaced with a combination of alternative buffers B2 and B3.

Here, in FIG. 11A, if the delay from the input pin of the preceding cell A1 to the input pin of the succeeding cell A2 is t1, then in FIG. 11B, the alternative buffers B2 and B3 are selected so that the delay t2 from the input pin of the cell A1 to the input pin of the cell A2 becomes equivalent to t1. Namely, when inserting buffers, the delay is calculated by adding the delay from the input pin of the preceding cell to the input pin of the buffer, with the delay from the input pin of the buffer to the input pin of the succeeding cell. Here, in FIGS. 11A-11B, a waveform of a signal with w1 attached illustrates waveform slew information used when calculating the delays t1 and t2.

Next, the placement solution generating section 14 places alternative buffers at the candidate areas (S117).

Here, Steps S113 to S117 are repeatedly executed for all logic correction locations included in the logic correction information U1 (S118). Consequently, insert buffers or alternative buffers are placed for all of the logic correction locations.

Having completed to place buffers for all of the logic correction locations (S118-No), the placement solution generating section 14 verifies influences on wiring delays that may be caused by deviation between an actual placement position of an insert buffer or an alternative buffer and the ideal placement position, replacement of the insert buffer with alternative buffers, and the like. Specifically, the placement solution generating section 14 calculates a temporary wire length of a net connected with an insert buffer or an alternative buffer (called a "placed buffer", hereafter) based on the placement position of the placed buffer (S119). A temporary wire length is not a wire length obtained with detailed routing, but a wire length calculated by setting assumed values to various wiring parameters. Next, the logic-level solution generating section 13 executes delay calculation considering delay values of placed buffers and temporary wire lengths and the like into account, and recalculates delay slack values (S120). If a setup time error is detected as a result of the calculation at Step S120 (S121-Yes), the placement solution generating section 14 replaces at least one of the placed buffers with a buffer having a smaller delay value than the placed buffer (S122). After replacing the buffer, the placement solution generating section 14 repeats Step S120 and after.

If no setup errors are detected (S121-No), the placement solution generating section 14 reflects fixed correction information (placement positions of the placed buffer and the like) into the netlist N1 and layout information L1 (S123).

Next, the routing solution generating section 15 executes wiring of parts to be wired that has been generated by insertion of the insert buffers or alternative buffers, based on the layout information L1. (S124). Wiring of parts to be wired may be executed with a publicly known technology.

Figure 12:
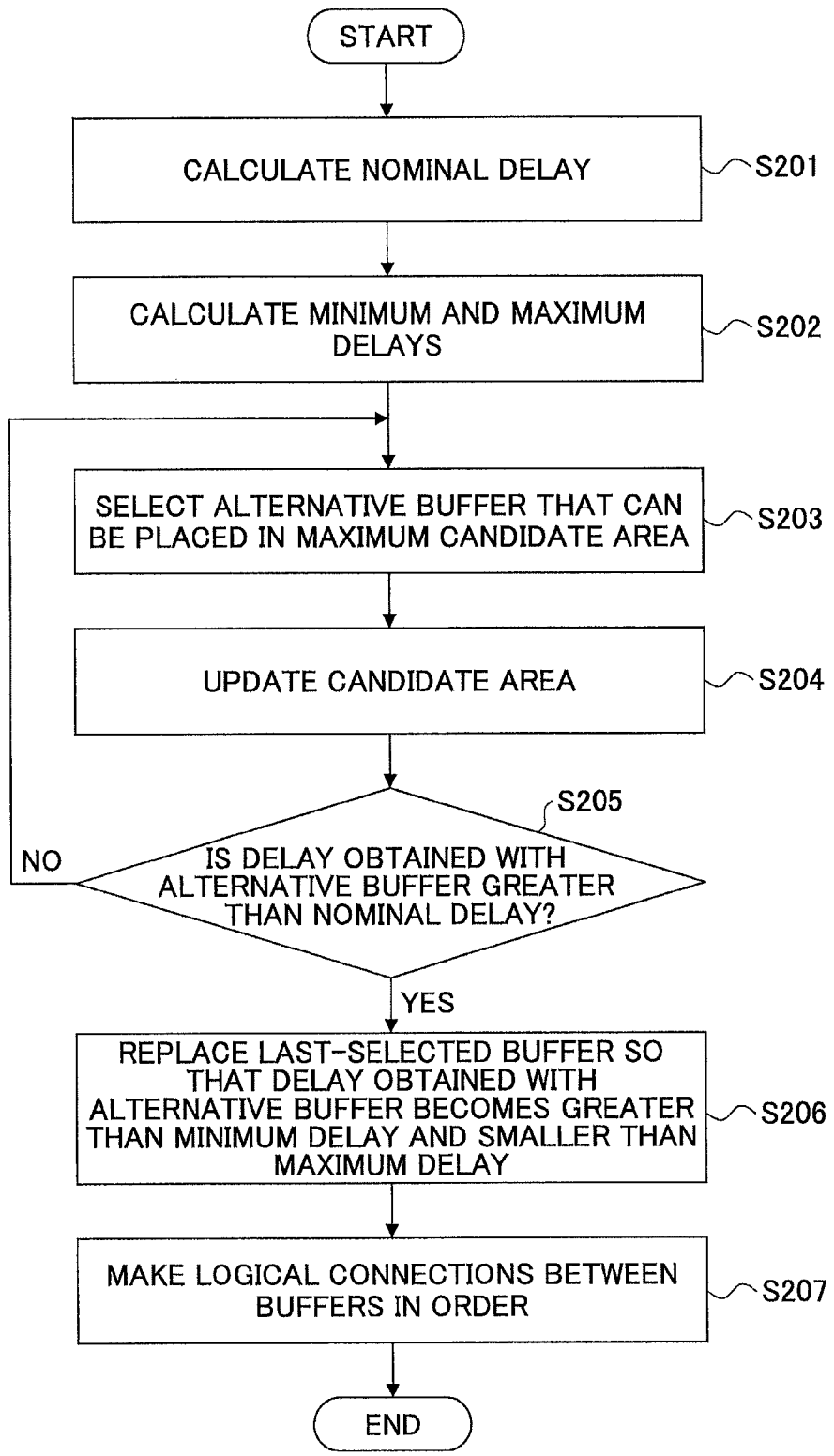
FIG. 12 is a flowchart illustrating an example of processing steps of a search procedure of alternative buffers.

Next, Step S116 will be described in detail. FIG. 12 is a flowchart illustrating an example of processing steps of a search procedure for alternative buffers.

At Step S201, the placement cell solution generating section 14 calculates a delay value (called "nominal delay", hereafter) from the input pin of the preceding cell to the input pin of the succeeding cell, assuming that all buffers to be inserted are placed at the ideal placement position (S201). In this case, the placement solution generating section 14 executes delay calculation following the predetermined rules that have been used for the delay calculation by the logic-level solution generating section 13 at Step S108. Also, the placement solution generating section 14 obtains information (for example, waveform slew information) assumed in delay calculation by the logic-level solution generating section 13 from the memory device 103 or auxiliary storage device 102, and executes delay calculation based on the information. Namely, the delay calculation at Step S201 is executed based on the same assumptions and rules as those at Step S108.

However, the logic correction information U1 may include the delay value of the input pin of the preceding cell to the input pin of the succeeding cell calculated by the logic-level solution generating section 13 for the buffer to be inserted at Step S108. In this case, the placement solution generating section 14 may use the delay value included in the logic correction information U1 as nominal delay. Also, the waveform slew information obtained during the delay calculation process by the timing analysis section 12 or the logic-level solution generating section 13 may be included in the logic correction information U1.

In either case, the rules for delay calculation by the logic-level solution generating section 13 are also used by the placement solution generating section 14; hence the placement solution generating section 14 can obtain the delay amount planned by the logic-level solution generating section 13. Consequently, the placement solution generating section 14 can search for a placement solution having a small error difference with the delay amount.

Next, the placement solution generating section 14 calculates a delay value for a case where a buffer with a minimum delay value in the buffers to be inserted is replaced with a buffer having a one-rank smaller delay value (called a "minimum delay", hereafter), and a delay value for a case where the buffer is replaced with a buffer having a one-rank greater delay value (called a "maximum delay", hereafter) (S202). Here, the delay values calculated are calculated from the input pin of the preceding cell to the input pin of the succeeding cell, similarly to Step S201. Also, the rules and assumptions used at Step S201 are also used at Step S202. Here, a one-rank smaller/greater delay value than the delay value of a buffer to be inserted is a next smaller/greater delay value to the delay value of the buffer to be inserted in the buffer list information BL.

Figure 13A:
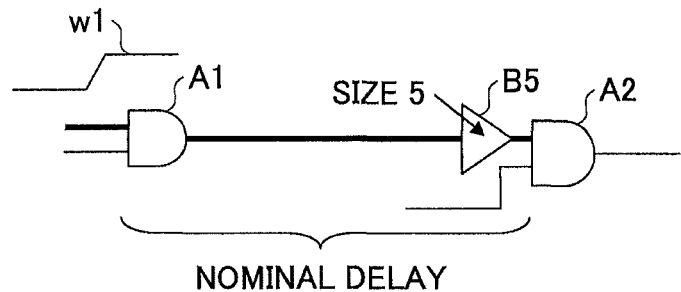
FIGS. 13A-13C are schematic views illustrating a first example of a minimum delay and a maximum delay.
Figure 13B:
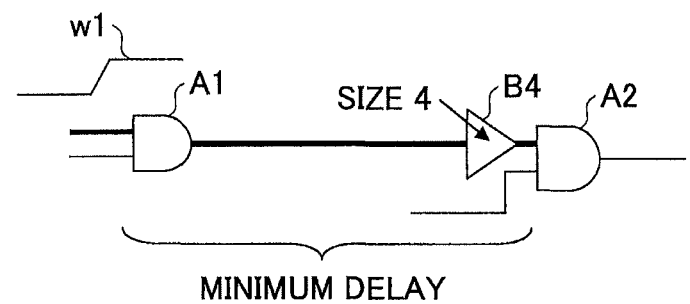
Figure 13C:
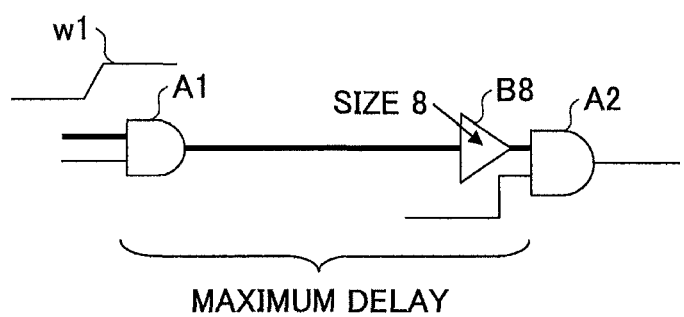

FIGS. 13A-13C are schematic views illustrating a first example of a minimum delay and a maximum delay for a single buffer to be inserted.

In FIG. 13A, an insert buffer B5 selected by the logic-level solution generating section 13 is inserted. Therefore, in this case, the delay value from the input pin of the preceding cell A1 to the input pin of the succeeding cell A2 corresponds to a nominal delay.

In FIG. 13B, the buffer B5 is replaced with a buffer B4 having a one-rank smaller delay value than the buffer B5. In the example in FIG. 13B, the buffer B5 is a buffer with the minimum delay value among the buffers to be inserted because there is only one buffer to be inserted. Therefore, the delay value from the input pin of the preceding cell A1 to the input pin of the succeeding cell A2 corresponds to a minimum delay, in which the buffer B5 is replaced with the buffer B4 having the one-rank smaller delay value.

In FIG. 13C, the buffer B5 is replaced with a buffer B8 having a one-rank greater delay value than the buffer B5. Therefore, in this case, the delay value from the input pin of the preceding cell A1 to the input pin of the succeeding cell A2 corresponds to a maximum delay.

Figure 14A:
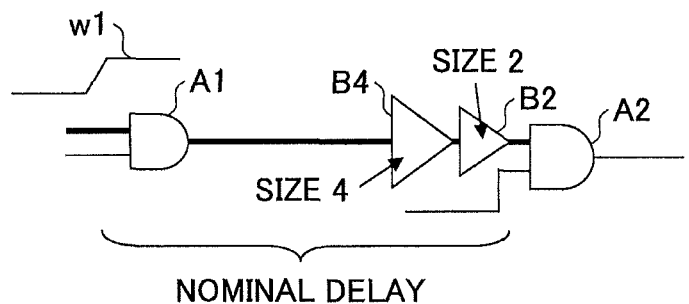
FIGS. 14A-14C are schematic views illustrating a second example of a minimum delay and a maximum delay.
Figure 14B:
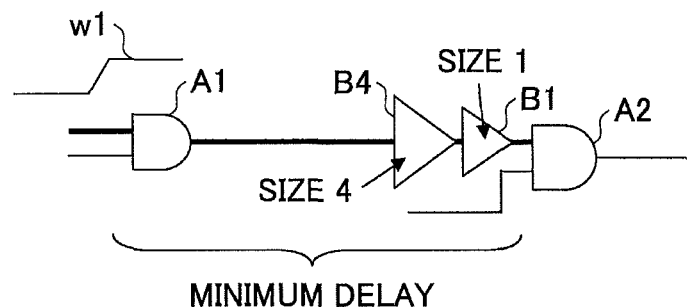
Figure 14C:
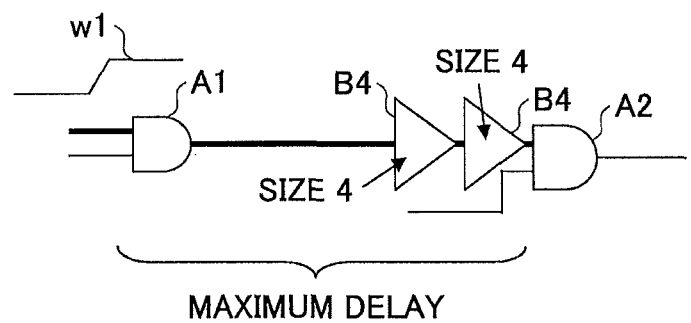

Also, FIGS. 14A-14C are schematic views illustrating a second example of a minimum delay and a maximum delay for two buffers to be inserted.

In FIG. 14A, insert buffers B4 and B2 selected by the logic-level solution generating section 13 are inserted. Therefore, in this case, the delay value from the input pin of the preceding cell A1 to the input pin of the succeeding cell A2 corresponds to a nominal delay.

In FIG. 14B, the buffer B2 is replaced with a buffer B1 having a one-rank smaller delay value than the buffer B2. In the example in FIG. 14B, the buffer B2 is assumed to have a smaller delay value than buffer B4. Namely, the buffer B2 is a buffer with the minimum delay value among the buffers to be inserted. Therefore, the delay value from the input pin of the preceding cell A1 to the input pin of the succeeding cell A2 corresponds to a minimum delay, in which the buffer B2 is replaced with the buffer B1 having the one-rank smaller delay value.

In FIG. 14C, the buffer B2 is replaced with a buffer B4 having a one-rank greater delay value than the buffer B2. Therefore, in this case, the delay value from the input pin of the preceding cell A1 to the input pin of the succeeding cell A2 corresponds to a maximum delay.

Here, although the number of insert buffers may be more than two, the minimum delay and maximum delay for those cases are obvious from FIG. 14, and their description is omitted.

Next, the placement solution generating section 14 calculates a combination of smaller numbers of buffers that have a delay equivalent to or sufficiently close to the nominal delay, and can be placed at the candidate areas. For example, the placement solution generating section 14 selects a maximum-size alternative buffer that can be placed at a candidate area from the cell library LIB (S203). Next, the placement solution generating section 14 places the alternative buffer at the candidate area, and updates the candidate area (S204). Steps S203 and S204 are repeated until selected alternative buffers are placed (for example, in series) and the delay value from the input pin of the preceding cell to the input pin of the succeeding cell (called a "delay obtained with an alternative buffer", hereafter) exceeds the nominal delay (S205). At Step S203 for the second time or later, a candidate area with a maximum size among the candidate areas at that moment is processed.

Here, wire length used for calculating the delay with an alternative buffer may be calculated based on predetermined assumptions using placement positions of alternative buffers as references. Alternatively, wire length may be calculated assuming that a buffer is placed at the ideal placement position because a placement position is restricted within the neighboring area, and wire lengths between succeeding buffers may be assumed to be zero.

If the delay obtained with the alternative buffers exceeds the nominal delay (S205-Yes), the placement solution generating section 14 replaces the alternative buffers so that the delay obtained with the alternative buffers becomes greater than the minimum delay and smaller than the maximum delay (S206). For example, the placement solution generating section 14 replaces the last selected alternative buffer with one or multiple buffers having smaller delay values than the alternative buffer. Namely, the minimum delay and maximum delay are used for determining whether the delay obtained with the alternative buffer is sufficiently close to the delay initially obtained with the insertion of the insert buffer (namely the delay planned by the logic-level solution generating section 13).

Once a combination of alternative buffers is determined, the placement solution generating section 14 makes logical connections between the alternative buffers in order of insertion of the alternative buffers (S207).

Here, the processing steps in FIG. 12 just illustrate an example. For example, multiple combinations may be calculated first which include at least one buffer that can be placed at a candidate area with a maximum size, and other buffers having the same or smaller sizes. Next, for each of the combination, it may be confirmed whether all buffers included in the combination can be placed in the candidate areas so that candidates for alternative buffers may be narrowed down.

As described above, according to the present embodiment, if an initial insert buffer cannot be placed, it is replaced with a group of alternative buffers with smaller sizes. This makes likelihood higher in that the group of alternative buffers are placed in the neighborhood of the logic correction location selected by the logic-level solution generating section 13. Consequently, it is possible to make an error difference smaller between the delay planned by the logic-level solution generating section 13 to be added and the actual delay. Also, the processing time can be shortened for a search process of vacant areas for insert buffers.

Also, by placing an insert buffer in the neighborhood of a logic correction location, an error difference with the actual delay can be made smaller in delay calculation, which simplifies delay calculation that is executed every time when alternative buffers are reselected to shorten processing time.

Further, by partitioning an initial insert buffer into alternative buffers, there is no need to reselect the logic correction location even if a vacant area is not found for the insert buffer selected by the logic-level solution generating section 13 to be placed. Consequently, it is possible to shorten processing time of timing ECO.

It is noted that although timing ECO is taken as an example for removing hold time errors as described above, an applicable range of embodiments of the present invention is not limited to hold time errors. For example, the present embodiment may be applicable to small-scale logic changes (deletion and addition of cells) that are in a state where timing error adjustment has already been applied.

In this case, the placement solution generating section 14 generates a placement solution for additional cells after deleting cells that are no longer needed from the original layout information. In this case, additional cells are not limited to buffers. Therefore, the placement solution generating section 14 generates a list of sizes and delays of cells, not only for buffers, but also for cells that are logically equivalent to cells designated as to be added in logic correction information (called "additional cell", hereafter). Then, the placement solution generating section 14 places an additional cell in the neighborhood of a logic change location. If it cannot be placed, the placement solution generating section 14 replaces the additional cell with a combination of smaller-size cells and buffers that is logically equivalent to the additional cell so that the delay of the initial cell to be replaced can be realized.

Here, in the present embodiment, the logic-level solution generating section 13 is an example of a selection section. Also, the placement solution generating section 14 is an example of a search section.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A timing error removing method comprising:
   selecting a logic-level correction location corresponding to a connection between cells in a semiconductor integrated circuit to be designed and a first buffer to be inserted at the logic-level correction location, wherein the logic-level correction location and the first buffer are able to remove a timing error in the semiconductor integrated circuit to be designed, and the selecting being executed by a central processing unit; and
   searching for a vacant area in the semiconductor integrated circuit where the first buffer can be placed for the logic-level correction location, and if the vacant area is not found, further searching for a combination of a plurality of buffers whose respective physical sizes are smaller than a physical size of the first buffer, the combination of the plurality of buffers being able to be placed in the semiconductor integrated circuit and being able to replace the first buffer in terms of a delay obtained as if the first buffer is inserted, and the searching being executed by the central processing unit.

2. The timing error removing method as claimed in claim 1, wherein the searching searches for the vacant area where the first buffer can be placed within a predetermined range from a position corresponding to the logic-level correction location in the semiconductor integrated circuit, and if the vacant area is not found, searches for the combination of the plurality of buffers being able to be placed in the predetermined range, wherein the predetermined range is a two-dimensional distance range measured from the position corresponding to the logic-level correction location.

3. The timing error removing method as claimed in claim 1, wherein the selecting calculates a delay from a preceding cell of the logic-level correction location to a succeeding cell of the logic-level correction location, based on a predetermined rule, to select the first buffer,
   wherein the searching searches for the combination of the plurality of buffers using a value calculated based on the predetermined rule for the delay obtained as if the first buffer is inserted.

4. A design support apparatus comprising:
   a selection section configured to select a logic-level correction location corresponding to a connection between cells in a semiconductor integrated circuit to be designed and a first buffer to be inserted at the logic-level correction location, wherein the logic-level correction location and the first buffer are able to remove a timing error in the semiconductor integrated circuit to be designed; and
   a search section configured to search for a vacant area in the semiconductor integrated circuit where the first buffer can be placed for the logic level correction location, and if the vacant area is not found, to further search for a combination of a plurality of buffers whose respective physical sizes are smaller than a physical size of the first buffer, the combination of the plurality of buffers being able to be placed in the semiconductor integrated circuit and being able to replace the first buffer in terms of a delay obtained as if the first buffer is inserted.

5. The design support apparatus as claimed in claim 4, wherein the search section searches for the vacant area where the first buffer can be placed within a predetermined range from a position corresponding to the logic-level correction location in the semiconductor integrated circuit, and if the vacant area is not found, searches for the combination of the plurality of buffers being able to be placed in the predetermined range, wherein the predetermined range is a two-dimensional distance range measured from the position corresponding to the logic-level correction location.

6. The design support apparatus as claimed in claim 4, wherein the selection section calculates a delay from a preceding cell of the logic-level correction location to a succeeding cell of the logic-level correction location, based on a predetermined rule, to select the first buffer,
   wherein the search section searches for the combination of the plurality of buffers using a value calculated based on the predetermined rule for the delay obtained as if the first buffer is inserted.

7. A non-transitory computer-readable recording medium having a program stored therein for causing a computer to execute a timing error removing method, the method comprising:
   selecting a logic-level correction location corresponding to a connection between cells in a semiconductor integrated circuit to be designed and a first buffer to be inserted at the logic-level correction location, wherein the logic-level correction location and the first buffer are able to remove a timing error in the semiconductor integrated circuit to be designed; and
   searching for a vacant area in the semiconductor integrated circuit where the first buffer can be placed for the logic-level correction location, and if the vacant area is not found, further searching for a combination of a plurality of buffers whose respective physical sizes are smaller than a physical size of the first buffer, the combination of the plurality of buffers being able to be placed in the semiconductor integrated circuit and being able to replace the first buffer in terms of a delay obtained as if the first buffer is inserted.

8. The non-transitory computer-readable recording medium as claimed in claim 7, wherein the searching searches for the vacant area where the first buffer can be placed within a predetermined range from a position corresponding to the logic-level correction location in the semiconductor integrated circuit, and if the vacant area is not found, searches for the combination of the plurality of buffers being able to be placed in the predetermined range, wherein the predetermined range is a two-dimensional distance range measured from the position corresponding to the logic-level correction location.

9. The non-transitory computer-readable recording medium as claimed in claim 7, wherein the selecting calculates a delay from a preceding cell of the logic-level correction location to a succeeding cell of the logic-level correction location, based on a predetermined rule, to select the first buffer,
   wherein the searching searches for the combination of the plurality of buffers using a value calculated based on the predetermined rule for the delay obtained as if the first buffer is inserted.

* * * * *